April 11, 1939.  W. H. MOSS  2,153,585
LAMINATED GLASS
Original Filed March 4, 1936
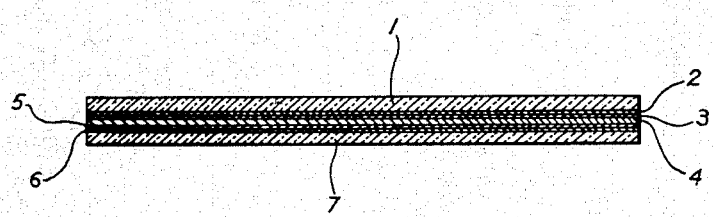
Inventor
William H. Moss
by
Sellers & W. Leimson
Attorneys Patented Apr. 11, 1939

2,153,585

UNITED STATES PATENT OFFICE 2,153,585

LAMINATED GLASS

William Henry Moss, London, England, assignor to Celanese Corporation of America, a corporation of Delaware Original application March 4, 1936, Serial No. 67,149. Divided and this application February 4, 1937, Serial No. 124,027. In Great Britain March 13, 1935

4 Claims. (Cl. 49—81)

This invention relates to the production of compositions and articles containing new condensation products, and more particularly to the production of compositions and articles containing gelatin and new condensation products of polyhydric alcohols with polybasic acids. This application is a division of my co-pending application S. No. 67,149, filed March 4, 1936.

It has been found that the products obtainable by condensing polyhydric alcohols with hydroxy polycarboxylic acids or acidylated hydroxy polycarboxylic acids, in the presence or absence of aldehydes, or with condensation products of hydroxy polycarboxylic acids with aldehydes, and stopping the condensation before the product becomes water-insoluble, are compatible with cellulose acetate and other cellulose esters and ethers, and do not readily discolour under the action of light. They are compatible, moreover, with gelatin. In view of the above properties the new condensation products are of great utility for ensuring good adhesion between a cellulose-acetate reinforcing layer and a gelatin adhesive layer in the production of splinterless glass.

The new condensation products themselves and processes for their preparation are claimed in my co-pending application S. No. 67,149. On the accompanying drawing the figure is a cross-section of safety glass made in accordance with one form of my invention.

The new condensation products may be produced by the condensation of polyhydric alcohols with hydroxy polycarboxylic acids in the presence or absence of aldehydes, or with acidylated hydroxy polycarboxylic acids, or with condensation products of hydroxy polycarboxylic acids with aldehydes, the condensation being stopped before the product becomes water insoluble. The invention includes compositions of matter containing gelatin and the new condensation products, and also includes the production of splinterless glass by processes involving the use of the condensation products as adhesives. The term "polyhydric alcohol" as employed in the present specification includes both dihydric alcohols and alcohols the molecules of which contain three or more hydroxyl groups. Similarly, the term "polycarboxylic acid" as employed in the present specification includes both dicarboxylic acids and acids the molecules of which contain three or more carboxyl groups.

The condensation products may be obtained for example by the condensation of a polyhydric alcohol such for example as glycerol, glycol, diethylene glycol, or propylene glycol, or even mannitol, or other higher polyhydric alcohol, with a hydroxy polycarboxylic acid, or with an acidylated hydroxy polycarboxylic acid or with a condensation product of a hydroxy polycarboxylic acid with an aldehyde such, for example, as formaldehyde. Examples of suitable polycarboxylic acids are citric acid, tartaric acid, methylene citric acid and acetyl citric acid. Preferably the alcohol employed contains a hydroxy substituent on each of two adjacent carbon atoms. Instead of condensing a condensation product of a hydroxy polycarboxylic acid and an aldehyde with a polyhydric alcohol, an aldehyde, e. g. formaldehyde or paraformaldehyde may be mixed with the polyhydric alcohol and the hydroxy polycarboxylic acid and condensation effected between all three reactants. Again, a polyhydric alcohol may be condensed with an aldehyde and the condensation product obtained reacted with the polycarboxylic acid. For instance, glycerol may be condensed with formaldehyde, yielding formal glycerol, which is reacted with citric acid according to the invention.

Condensation of the reactants to produce the products of the present invention may be brought about by simple heating in the absence of catalysts. Catalysts, e. g. acid or basic catalysts may, however, be employed. The reaction is advantageously continued until a product is obtained which is soluble in water and is capable of forming films, e. g. upon evaporation of water from a thin layer of its aqueous solution. Preferably condensation is stopped only shortly before the stage is reached when a water-insoluble product is obtained.

Of particular value are the condensation products obtainable by the condensation of glycerol with citric acid or with an acidyl derivative thereof, such for example as acetyl citric acid, or with a condensation product of citric acid and an aldehyde, such for example, as methylene citric acid, substantially equimolecular proportions of the reactants being employed in each case. Thus, for example, equimolecular proportions of methylene citric acid and glycerol, or of citric acid and glycerol, may be heated at 180° C. until a test sample gels when heated in a glass tube in an oil bath for 10 minutes at 185 to 190° C. or slightly higher temperature. The condensation of methylene citric acid and glycerol under these conditions usually takes about an hour and a quarter.

The condensation products of the present invention are soluble in water and are compatible with gelatin and with cellulose esters and ethers, such, for example, as cellulose acetate, cellulose formate, cellulose butyrate, cellulose nitroacetate or nitrocellulose, or ethyl cellulose, methyl cellulose, or benzyl cellulose. With cellulose acetate they form clear films which are softened by water and have adhesive properties.

Films, foils, and other compositions containing the condensation products of the present invention and cellulose acetate or other cellulose ester or ether with or without plasticizers, resins, fire retardants, effect materials and the like, form an important feature of the present invention. The condensation products, both alone and in admixture with other compounds, are of great value for use as adhesives. They are, however, of especial value for use where adhesion is desired between cellulose acetate and gelatin, as for example in splinterless glass.

As is well known, cellulose acetate, in view of its light fastness, is particularly suitable for use in the reinforcing layer in splinterless glass. It is also well known that few substances possess the strong adhesion for glass possessed by gelatin. Unfortunately, adhesion between gelatin and cellulose acetate is poor. The condensation products of the present invention, however, may be employed to give very strong adhesion between cellulose acetate and gelatin and are therefore of especial value for the production of splinterless glass wherein a cellulose acetate reinforcement is secured to glass through a gelatin adhesive layer. When used for this purpose the condensation product may be incorporated in the cellulose acetate reinforcement, or in the gelatin, or it may form a thin layer between the cellulose acetate and gelatin.

The following examples illustrate the production of the condensation products of the present invention and adhesives and other products containing them:—

Example 1

20.4 parts of methylene citric acid are heated with 6 parts of glycerol in an open vessel at 180° C. until a test sample gels when heated for 10 minutes at 185 to 190° C. in a glass tube in an oil bath. At this stage the product is yellow in colour and is just hard at ordinary temperatures. The time taken to reach this stage is about 1 hour and 15 minutes.

Instead of using methylene citric acid and glycerol in this example, condensation may be effected between citric acid, glycerol, and paraformaldehyde.

Example 2

20 parts of citric acid and 9.2 parts of glycerol are condensed as in Example 1. The condensation product obtained is clear and colourless. In place of glycerol, glycol or formal glycerol may be employed and in place of citric acid, methylene citric acid, acetyl citric acid or tartaric acid may be employed, the proportions being substantially equimolecular.

Example 3

This example illustrates the use of the condensation products of the present invention in the manufacture of splinterless glass.

Two pieces of glass are each sprayed on one surface with a solution containing ½ to 2.5% of gelatin in water or in a mixture of water and alcohol and are then dried either in the air or at slightly elevated temperatures. A 1% to 5% aqueous solution of a condensation product obtained in accordance with the process of Example 1 or 2 is then sprayed on to the surface of the gelatin and the sheets again dried. A thin sheet of plasticised cellulose acetate is dipped into a softening solution, consisting of 90 parts of triacetin and 10 parts of alcohol or ethyl lactate and immediately after dipping placed between the coated sides of the glass sheets. The assembly is then pressed in a steam-heated press for 10 minutes using 20 pounds per square inch steam pressure and 50 pounds per square inch hydraulic pressure. A splinterless glass the component parts of which adhere strongly to each other is obtained.

Example 4

An adhesive suitable for use with cellulose-acetate foil is made up from the following:—

| | Parts |
|---|---|
| Condensation product obtained from methylene citric acid and glycerol according to Example 1 | 12.4 |
| Gelatin | 0.9 |
| Water | 14 |

The condensation product and the gelatin are dissolved in separate portions of the water and the resultant solutions mixed together, yielding a composition which is liquid at ordinary temperatures. It constitutes an excellent adhesive for cellulose-acetate foil and may be used for instance for sealing wrappings of cellulose-acetate foil on cigarette packages or other articles. When spread out as a thin coating it remains tacky for a period of 1 to 2 minutes so that fairly large surfaces can be coated without the parts first coated drying out and losing their adhesive properties.

A sheet of safety glass according to the invention is illustrated in cross-section in the accompanying drawing which is to be taken by way of example only.

In the drawing 1 and 7 are sheets of glass coated with layers of gelatin 2 and 6 respectively, and 4 is a sheet of cellulose acetate plastic bonded to each of said gelatin layers by layers 3 and 5 each comprising a water-soluble condensation product according to the invention.

Having described my invention what I desire to secure by Letters Patent is:—

1. Safety glass comprising a sheet of glass coated with a layer of gelatin and a sheet of cellulose-derivative plastic bonded to said gelatin by means of a water-soluble condensation product of a polyhydric alcohol with a compound selected from the group consisting of citric acid, tartaric acid, methylene citric acid and acetyl citric acid.

2. Safety glass comprising a sheet of glass coated with a layer of gelatin and a sheet of cellulose-acetate plastic bonded to said gelatin by means of a water-soluble methylene-citric-acid/polyhydric-alcohol condensation product.

3. Safety glass comprising a sheet of glass coated with a layer of gelatin and a sheet of cellulose-acetate plastic bonded to said gelatin by a layer comprising a water-soluble condensation product of a polyhydric alcohol with a compound selected from the group consisting of citric acid, tartaric acid, methylene citric acid, and acetyl citric acid.

4. Safety glass comprising a sheet of glass coated with a layer of gelatin and a sheet of cellulose-acetate plastic bonded to said gelatin by a layer comprising a water-soluble methylene-citric-acid/polyhydric-alcohol condensation product.

WILLIAM HENRY MOSS.